United States Patent [19]
Premiski et al.

[11] Patent Number: 4,765,366
[45] Date of Patent: Aug. 23, 1988

[54] TEMPERATURE COMPENSATED CONTROL VALVE FOR AUTOMATIC TRANSMISSIONS

[75] Inventors: Vladimir Premiski; Claudia Premiski, both of BAM-Willerscheid; Winfried Schultz, Pulheim, all of Fed. Rep. of Germany

[73] Assignee: Ford Motor Company, Dearborn, Mich.

[21] Appl. No.: 100,497

[22] Filed: Sep. 24, 1987

[30] Foreign Application Priority Data

Oct. 4, 1986 [DE] Fed. Rep. of Germany ....... 3633836

[51] Int. Cl.⁴ .............................................. F16K 47/00
[52] U.S. Cl. ................................... 137/593; 137/468; 138/31
[58] Field of Search ...................... 137/468, 568, 593; 138/31; 251/48

[56] References Cited

U.S. PATENT DOCUMENTS

| 2,436,009 | 2/1948 | Kremiller | 138/31 |
| 2,764,998 | 10/1956 | McCuistion | 138/31 |
| 3,985,063 | 10/1976 | Lemon | 138/31 X |

FOREIGN PATENT DOCUMENTS

| 2137160 | 4/1978 | Fed. Rep. of Germany . |
| 2017238 | 1/1981 | Fed. Rep. of Germany . |

OTHER PUBLICATIONS

Dupont Catalog; "The Engineering Properties of VITON Fluoroelastomer".

*Primary Examiner*—Robert G. Nilson
*Attorney, Agent, or Firm*—Donald J. Harrington; Keith L. Zerschling

[57] ABSTRACT

A temperature-compensated fluid flow control valve for a valve system of an automatic transmission having a displaceable valve spool which is acted upon by pressure in a valve chamber against the force of a spring and on which an additional force proportional to temperature counteracts the pressure loading, the additional force being produced by the back pressure at an outflow orifice of variable cross-section which is reduced in size as the temperature rises.

7 Claims, 2 Drawing Sheets

TEMPERATURE COMPENSATED CONTROL VALVE FOR AUTOMATIC TRANSMISSIONS

BACKGROUND OF THE INVENTION

The invention relates to temperature-compensated control valves, in particular for hydraulic controls of an automatic transmission for automotive vehicles.

An example of a known temperature compensated control valve is disclosed in German Patent No. 20 17 238. That valve comprises a valve spool that is acted upon by pressure in a valve bore against the force of a valve spring. An additional force from a thermostatic device counteracts the pressure loading and tends to displace the valve spool as temperature increases.

The known temperature-compensated control valve of the German patent is constructed as a regulating valve for establishing a control pressure for operating the control valve circuit of an automatic transmission. It comprises a coil spring arrangement that exerts a valve actuating force on a valve spool by means of a lever arm. That force counteracts the pressure loading. In this way, although the viscosity of the transmission oil varies in accordance with variations in temperature, the valve compensates for the effect of viscosity changes on gear ratio shift timing. The complexity of the structure for effecting that compensation, however, is objectionable.

German Auslegeschrift (Published specification) No. 21 37 160 shows another known hydraulic control that includes an accumulator or pressure reservoir 22 for cushioning the gearshifting clutches and brakes for an automatic transmission. It includes throttling devices 30, 17 and 1 for controlling the outflow from the accumulator under different operating conditions. This design requires suitable control valves or suitable one-way valve combinations, which complicate the design of the hydraulic control.

BRIEF DESCRIPTION OF THE INVENTION

The invention is an improvement in temperature-compensated control valves, particularly for hydraulic controls of motor vehicle transmissions. It makes possible the desired control of gear ratio shift timing as a function of temperature changes in a very simple manner. It controls the operation of the clutches and brakes that are energized by the temperature compensated pressure.

That force for actuating the transmission clutches and brakes is produced by back pressure of the pressure medium. The outflow from the control valve, which produces the back pressure, is restricted by an orifice which is controlled by a member with a high degree of thermal expansion that reduces the cross-section of the orifice as the temperature rises. The opening of the orifice is controlled by the member with a high degree of thermal expansion. That member is made in a very simple manner by a suitable plastic material with a high degree of thermal expansion.

Two or more partially overlapping plates of plastic material with a high degree of thermal expansion are arranged with their outer edges secured and their internal edges overlapping to form an orifice of variable cross-section.

The overlapping plates of plastic material are provided on their internal edges with V-shaped or semicircular indentations which form additional orifice areas that continuously reduce the effective cross-section of the orifice as the temperature rises.

DESCRIPTION OF THE FIGURES OF THE DRAWINGS

The invention is described in greater detail with reference to drawings, in which.

PARTICULAR DESCRIPTION OF THE INVENTION

Figure 1:
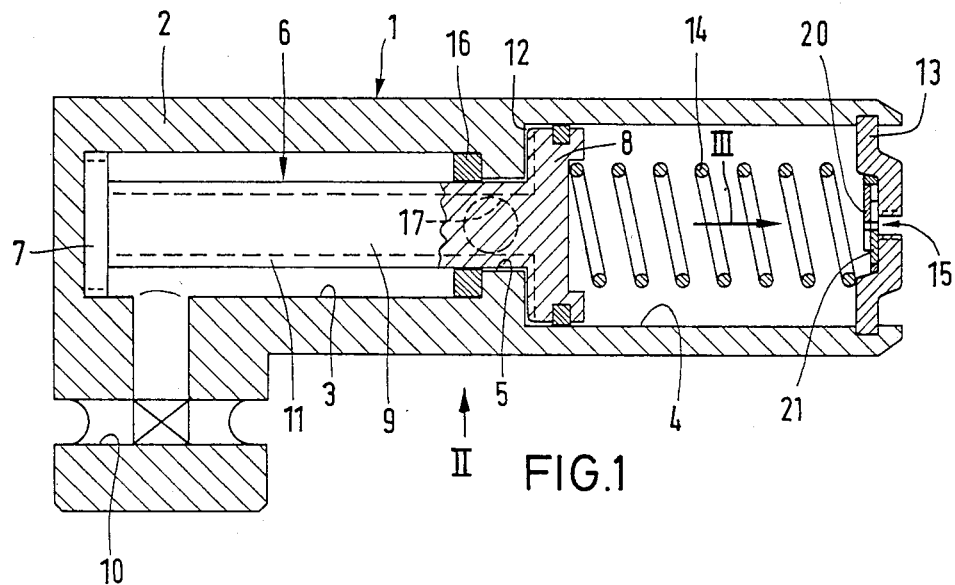
FIG. 1 is a vertical section through an embodiment of a temperature-compensated control valve in the form of an accumulator.
Figure 2:
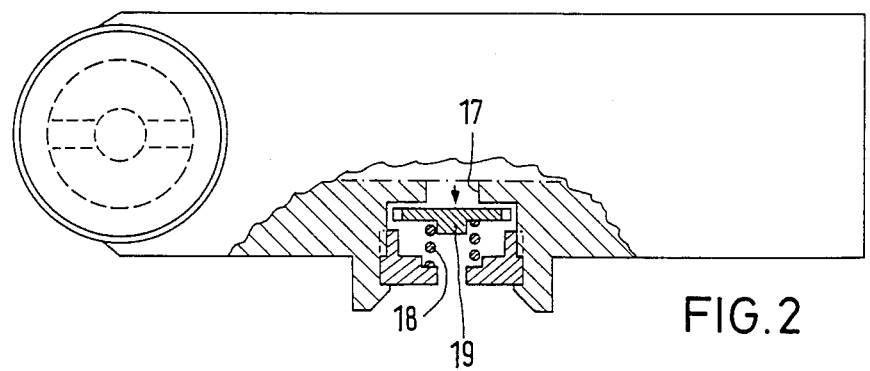
FIG. 2 is an elevation of a portion of the control valve as seen in the direction of arrow II in FIG. 1.

The temperature-compensated control valve 1 illustrated in FIGS. 1 and 2 essentially comprises a valve housing 2 in which are formed two valve bores 3 and 4 with a connecting portion 5.

A movable valve spool 6, which comprises two piston portions 7 and 8 connected together by means of a shaft portion 9, are arranged in the valve chamber 2.

Pressure fluid at supply pressure passes from inlet 10, which can be secured by means of a ball check valve, into the valve bore 3. It then passes flattened portions 11 on shaft portion 9 through the connecting portion 5 into the space 12 behind the piston portion 8, which acts as an accumulator piston. Pressure builds up in space 12, counteracts the force of the helical compression spring 14 arranged between the closure cover 13 and the piston portion 8.

The piston portion 8 must displace the pressure medium, which is present in the valve bore 4, through the orifice 15 provided in the closure cover 13. Orifice 15 has a cross-section which is variable in size as a function of temperature.

When the valve spool 6 has traveled its entire displacement path, its head portion 7 comes to bear against a seal 16 in the valve bore 3 and thus prevents a further supply of pressure medium into the region of the valve bore 4, as a result of which the operating pressure can now rise to the desired level.

An outlet opening 17 with a one-way plate valve 19 loaded by a spring 18 is provided in the region of the connecting portion 5.

Figure 3:
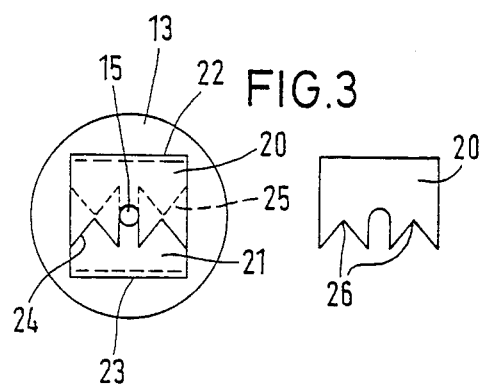
FIG. 3 is an elevation of the orifice with a variable cross-section as seen in the direction of arrow III in FIG. 1.

As shown in FIG. 3, the orifice 15 is formed by two plates 20 and 21 disposed in a recess in the closure cover 13. The plates consist of plastic material with a high degree of thermal expansion, such as Viton, a fluoelastomer developed and marketed by DuPont Corporation. The plates partly overlap one another.

The plates 20 and 21 are secured with their outer edges 22 and 23 in a recess in the closure cover 13. They are provided on their internal edges 24 and 25 with V-shaped indentations which at operating temperature form two additional orifices 26 that lie parallel to the orifice 15. Orifices 26 are closed by the expansion of the two plates 20 and 21 as the temperature rises.

With a high viscosity at the normal opearating temperature, a greater cross-section of the orifice is made available for the outflowing pressure medium and the corresponding gear-shifting actions can be performed in the desired shifting time. If the temperature of the transmission oil rises substantially, the gear-shifting time would be reduced by the decreasing viscosity of the transmission oil, as a result of which troublesome gear-shifting jolts would become perceptible. Because of the plates of plastics material with a high degree of thermal expansion which expand with rising temperature, the two additional orifices 26 are closed. As a result of that closing the optimum gearshifting time desired for a specific shifting action is maintained.

Figure 4:
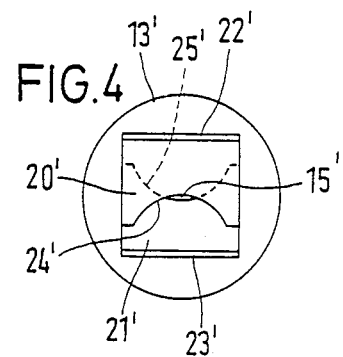
FIG. 4 is an elevation view similar to the elevation view of FIG. 3 showing a second embodiment of the orifice with a variable cross-section.

A further embodiment of a throttle orfice with a variable cross-section is illustrated in FIG 4. The orifice 15' of the FIG. 4 design comprises two plates 20' and 21' of plastic with a high degree of thermal expansion, e.g., Viton. These are secured with their outer edges 22' and 23' in the recess in the closure cover 13'. The lugs 20' and 21' are provided on their inner edges 24' and 25' with semicircular indentation which in the region of their overlapping form a lenticular orifice whose cross-section is increasingly reduced by the expansion of the plastics material.

It should be further pointed out that the orifices 15 and 15' with variable cross-section also form a type of tilt check valve. As the accumulator valve is released, the check valve permits rapid filling of the valve bore 4 with pressure medium. In order to maintain the operation of the orifice with a variable cross-section, the closure cover 13 forms an abutment on one side for the plates 20 and 21 or 20' and 21', respectively. The plates are acted upon with pressure medium in the valve bore 4.

Figure 5:
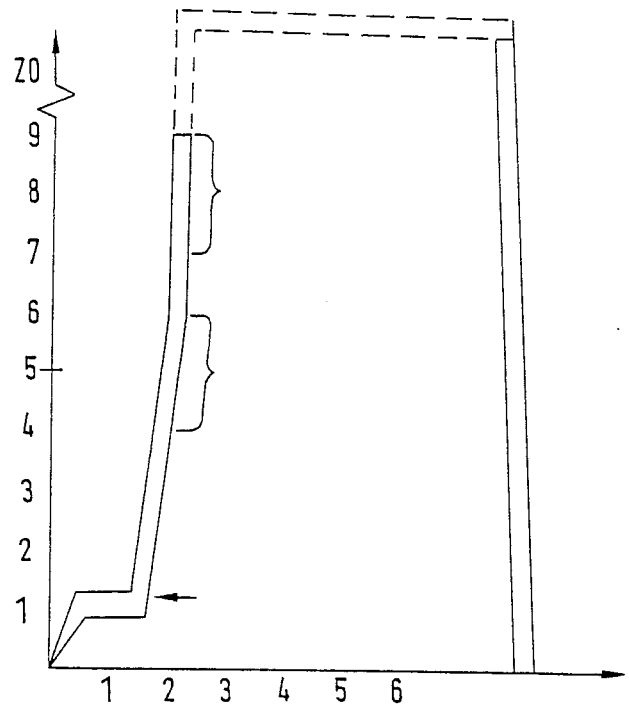
FIG. 5 is a diagram of the gearshift pressure build-up.

The relationship of the gearshifting pressure to time is shown in FIG. 5.

In constructing a throttle orifice and valve with a cross-section that varies as a function of the temperature, it is possible, of course, to use various materials with a high degree of thermal expansion in widely differing geometrical arrangements of the plates.

I claim:

1. A temperature compensated control valve for an automatic transmission control comprising a valve chamber, a valve spool in said chamber, said spool having a piston that cooperates with said valve chamber to define fluid pressure chambers with fluid on each side of said piston;

inlet and outlet fluid delivery passages communicating with said valve chamber on one side of said piston, said inlet passage being adapted to be connected to a pressure source and said outlet passage being adapted to be connected to pressure actuatable parts of said transmission control, said piston being movable in said valve chamber as pressure in said inlet and outlet passages increases; and a flow control orifice in said valve chamber on the other side of said piston, said orifice being formed by thermal sensitive, relatively movable parts whereby the effective size of said orifice is reduced upon an increase in temperature of said fluid.

2. A temperature compensated control valve as set forth in claim 1 wherein said valve includes a valve spring in said valve chamber acting on said spool wherein the spring force opposes the force of the fluid pressure in said passages.

3. The combination as set forth in claim 1 wherein said valve spool comprises a second piston portion at one end thereof and guided on said valve chamber, said first mentioned piston being located at the opposite end of said spool whereby it is adapted to function as an accumualtor piston.

4. The combination as set forth in claim 2 wherein said valve spool comprises a second piston portion at one end thereof and guided on said valve chamber, said first mentioned piston being located at the opposite end of said spool whereby it is adapted to function as an accumulator piston, said valve parts being flexible to define a check valve adapted to permit rapid filling of said valve chamber with fluid when said piston moves away from said orifice.

5. The combination as set forth in claim 1 wherein said outlet fluid delivery passage comprises a one-way valve means for accommodating flow from said valve chamber but preventing flow from said outlet fluid delivery passage to said valve chamber.

6. The combination as set forth in claim 2 wherein said outlet fluid delivery passage comprises a one-way valve means for accommodating flow from said valve chamber but preventing flow from said outlet fluid delivery passage to said valve chamber.

7. The combination as set forth in claim 3 wherein said valve comprises means for interrupting the flow of fluid from said inlet passage to said valve chamber when said second piston portion is stroked fully thereby causing a pressure buildup in said passages at a fast rate.

* * * * *